United States Patent
Patwardhan et al.

(10) Patent No.: US 10,884,866 B2
(45) Date of Patent: Jan. 5, 2021

(54) SYSTEMS AND METHODS FOR SNAPSHOT-LESS BACKUPS

(71) Applicant: EMC IP Holding Company LLC, Hopkinton, MA (US)

(72) Inventors: Kedar Patwardhan, Irvine, CA (US); Kiran Dudala, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 263 days.

(21) Appl. No.: 16/036,893

(22) Filed: Jul. 16, 2018

(65) Prior Publication Data

US 2020/0019466 A1    Jan. 16, 2020

(51) Int. Cl.
*G06F 11/14* (2006.01)
*G06F 9/455* (2018.01)

(52) U.S. Cl.
CPC ...... *G06F 11/1451* (2013.01); *G06F 9/45558* (2013.01); *G06F 11/1464* (2013.01); *G06F 2009/45583* (2013.01); *G06F 2009/45595* (2013.01); *G06F 2201/84* (2013.01)

(58) Field of Classification Search
CPC .................................................. G06F 11/1451
USPC .......................................................... 707/639
See application file for complete search history.

(56) References Cited

U.S. PATENT DOCUMENTS

2010/0077165 A1* 3/2010 Lu ..................... G06F 11/1451
                                                            711/162
2013/0054529 A1* 2/2013 Wang ................. G06F 11/1448
                                                            707/639

* cited by examiner

*Primary Examiner* — Syling Yen
(74) *Attorney, Agent, or Firm* — Staniford Tomita LLP

(57) ABSTRACT

A first snapshot of a primary disk of a virtual machine (VM) is requested at a beginning of a current backup cycle. A first indication that the first snapshot has been created includes a first listing of changed blocks since a last snapshot was requested. The first snapshot is deleted. Blocks listed in the first listing are copied while the first snapshot is absent. After the copying, a second snapshot is requested. A second indication that the second snapshot has been created includes a second listing of changed blocks since the first snapshot. Blocks listed in both the first and second listings are copied while the second snapshot is present.

17 Claims, 10 Drawing Sheets

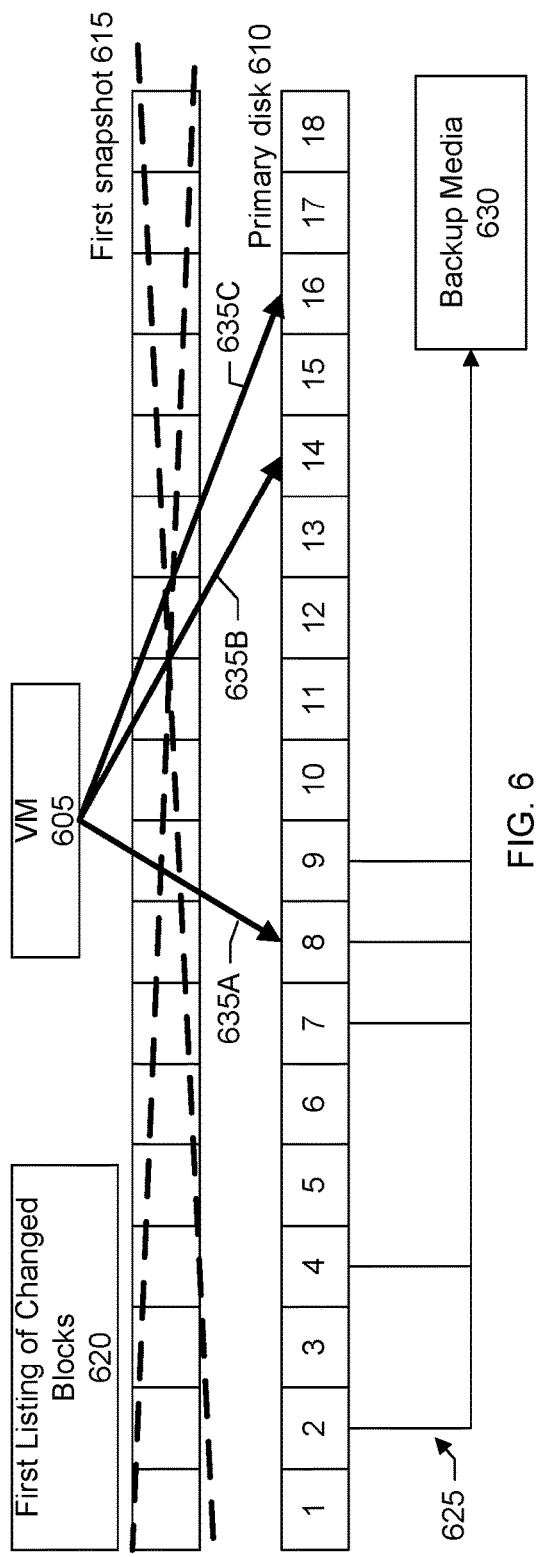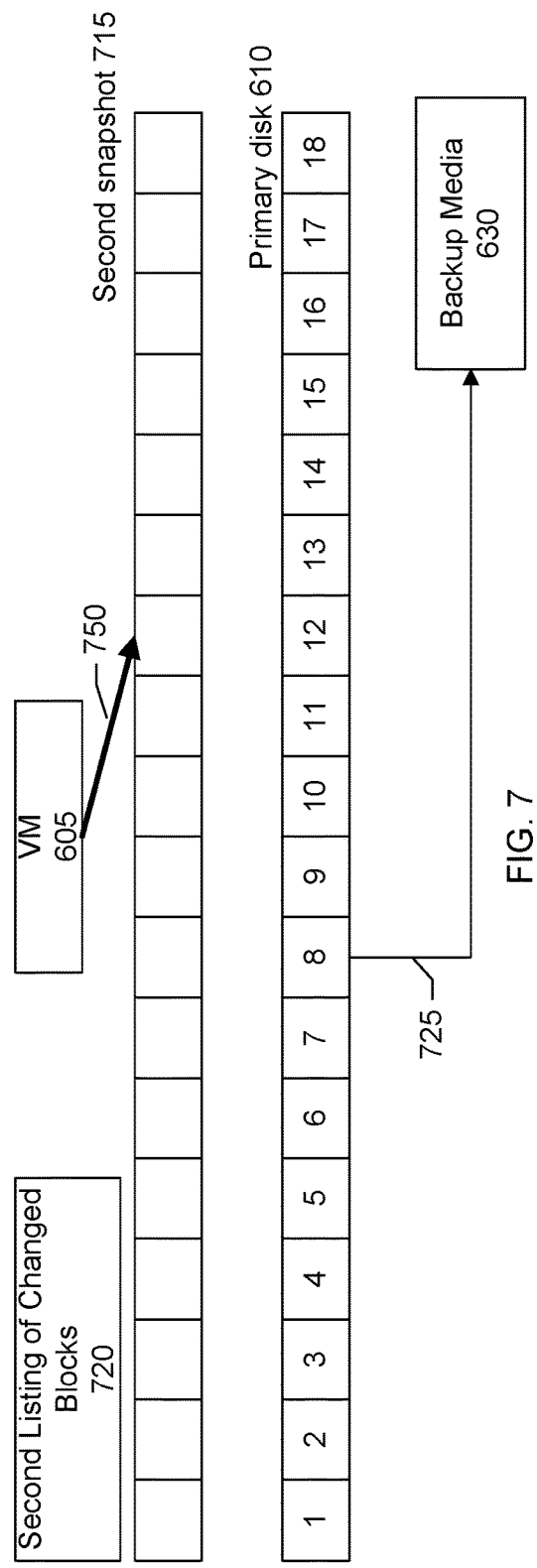
FIG. 6
FIG. 7

SYSTEMS AND METHODS FOR SNAPSHOT-LESS BACKUPS

TECHNICAL FIELD

The present invention relates generally to information processing systems, and more particularly to backing up data.

BACKGROUND

Backing up data requires time to complete. Making changes to data while a backup is in progress can result in an inconsistent backup. One technique to help ensure consistent backups is to disable write access to the data during the backup. While regular downtime may be acceptable for users of low-availability systems, such downtime is generally not acceptable for high-availability systems that are expected to remain operating 24/7 (24 hours a day and 7 days a week).

Snapshots have been promoted as a way to allow organizations to make backups while also avoiding downtime while the backup is in progress. A snapshot can be used to preserve a particular point-in-time. Snapshots can be created very quickly because they represent a virtual copy of the data rather than an actual copy of the data. A backup may then proceed using the snapshot while the data continues to be accessed and written to. Processing snapshots, however, is not without costs. Depending upon factors such as the amount of data to be backed up, time required to perform the backup, changes made during the backup, and other factors, there can be a significant load placed on the storage system from which the data is being backed up. The load on the storage system can cause a degradation in performance of the storage system. Such degradation can lead to increased latency times and delays in accessing data. Therefore, there is a need for improved systems and techniques to reduce load on storage systems in connection with backups.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 6 shows a block diagram of changes being made while a backup is in progress, according to one or more embodiments.

FIG. 7 shows another block diagram of changes being made while the backup is in progress, according to one or more embodiments.

DETAILED DESCRIPTION

Figure 1:
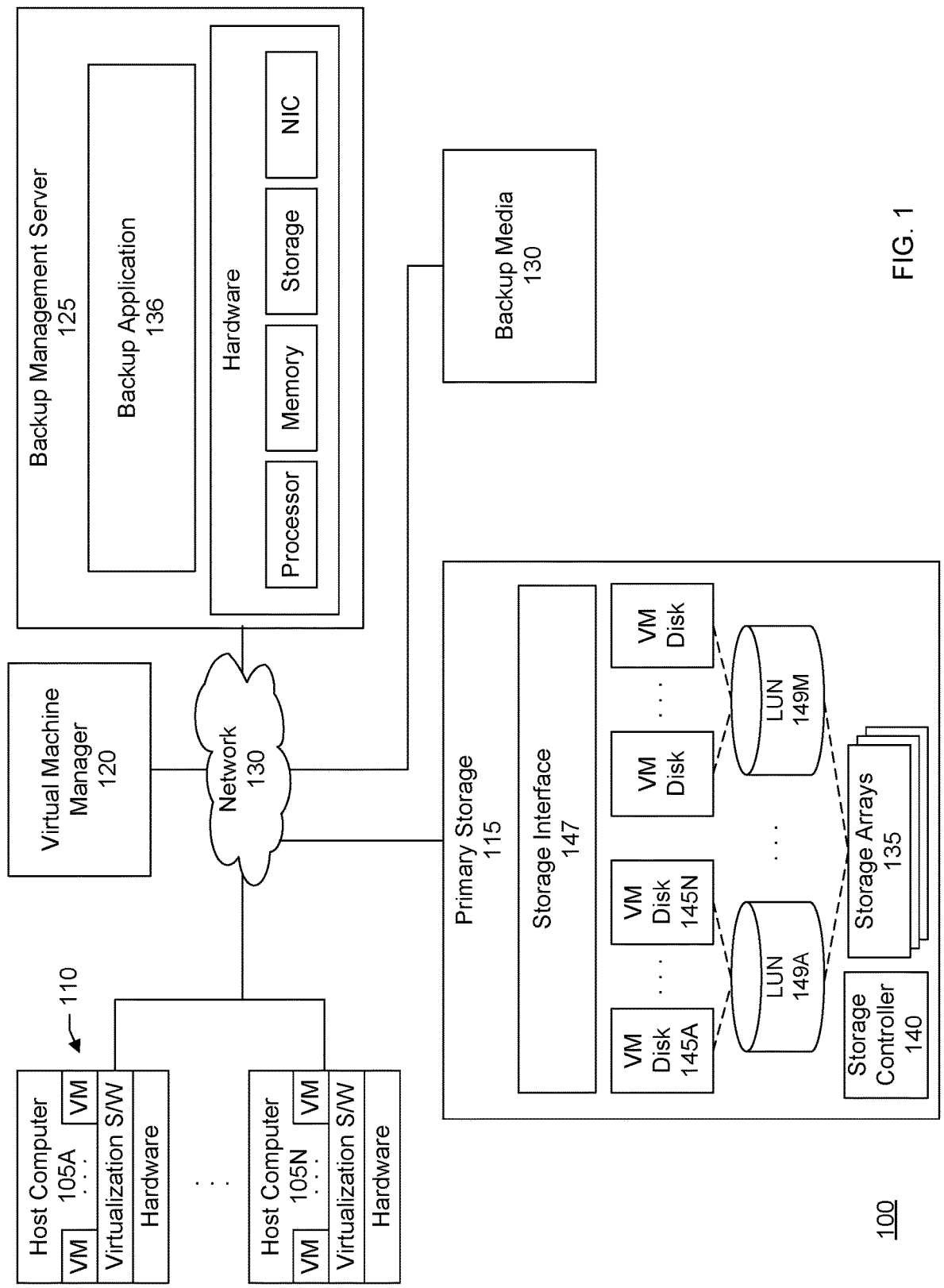
FIG. 1 shows a block diagram of an information processing system for backups, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for snapshot-less backups. Backups require time to complete. Making changes while a backup is in progress can result in data corruption and an inconsistent backup. One technique to help ensure consistent backups is to temporarily disable write access to the data during the backup. While regular downtime may be acceptable for users of low-availability systems, such downtime is not acceptable for high-availability 24/7 systems.

To avoid downtime, many high-availability systems rely on snapshots. A snapshot can be used to preserve a state of computer system at a particular point in time. Generally, snapshots can be created very quickly because a snapshot represents a virtual copy of data rather than an actual copy of the data itself. A backup can then proceed with the snapshot. One type of snapshot is referred to as a reverse snapshot. An example of a reverse snapshot is provided by the VMware VStorage Application Programming Interface (API) for Data Protection (VADP) from VMware of Palo Alto, Calif. VMware VADP includes a storage API that that may be used for the backup of VMware (e.g., vSphere) virtual machines (VMs) and, more specifically, a virtual machine disk (e.g., VMDK) of the virtual machine. In a reverse snapshot, writes by a VM are absorbed by the VMDK snapshot.

The processing associated with such a snapshot, however, can place a very heavy load on the storage array and degrade the overall performance of the storage array. For example, users and other applications attempting to access the storage array may experience long periods of latency or other delays. In a specific embodiment, systems and techniques are provided for reducing load on the storage array through snapshot-less backups. In this specific embodiment, backups can be performed, writes can continue to be issued during the backup, and the performance degradation resulting from the processing of snapshots is reduced. Some embodiments are described in conjunction with VMware VMDK snapshots and the VMware virtualization platform. It should be appreciated, however, that aspects and principles of the systems and techniques described can be applied to other snapshots having different virtual disk formats and other virtualization platforms and virtualization vendors.

FIG. 1 shows a block diagram of a computer network or information processing system 100 in which snapshot-less backups may be implemented. System 100 includes any number of hosts 105A-N, each hosting any number of virtual machines 110, primary storage 115 storing data of the virtual machines, a virtual machine manager 120, a backup management server 125, and backup media 130, each of which are interconnected by a network 130.

The network may be a cloud network, local area network (LAN), wide area network (WAN), or other appropriate network. The network provides connectivity to the various systems, components, and resources of system 100, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each virtual machine, or other type of centralized network server.

A host may be a physical computing platform having a hardware platform that includes computing components such as a processor, memory, and so forth. In an embodiment, the host includes virtualization software to support the execution of one or more virtual machines. A virtual machine is a software abstraction of a physical computing machine. A virtual machine is an operating system (OS) or application environment that is installed on software, which imitates dedicated hardware. Virtualization can limit costs by reducing the need for physical hardware systems.

Storage for the virtual machines is provided by the primary storage system. For example, the virtual machines may use virtual machine disks (e.g., VMDKs) 145A-N to store their operating system, program files, installed applications, and other data associated with the activities of the virtual machines.

The primary storage system may include any number of storage arrays 135 managed by a storage controller 140, and a storage interface 147 (such as an API). A storage array is a data storage system that may be used for block-based, file-based, or object storage. A storage array may include any number of hard disk drives, solid-state drives, or both (e.g., hybrid array). A storage array may be referred to as a disk array or flash array. The storage controller may expose the storage arrays as logical unit numbers (LUNs) 149A-M on which the virtual disks or virtual volumes may be stored.

A LUN is a number or other identifier used to identify a logical storage unit. A disk may be configured as a single LUN or may include multiple disks. A LUN may include a portion of a disk, portions of multiple disks, or multiple complete disks. A virtual disk of the primary storage may be referred to as a primary disk, primary volume, virtual primary disk, or virtual primary volume. A virtual volume may be created from a LUN or a portion of a LUN. Each virtual volume (or virtual disk) may be associated with a single particular virtual machine. A virtual machine may be associated with multiple virtual volumes or virtual disks. In an embodiment, the virtual machine manager associates virtual volumes to the virtual machines. Through storage interface 147, the virtual disks may be exposed to other programs, applications, and components of system 100. Requests may be received through the storage interface to create snapshots, delete snapshots, copy data, and so forth.

The virtual machine manger provides a central location to manage the virtual machines. Management tasks may include provisioning resources, adjusting compute, memory, and storage of the virtual machines, configuring the virtual machines, receiving commands and requests from the backup application, providing updates to the backup application, and so forth.

In a specific embodiment, the virtual machine manager is responsible for changed block tracking (CBT), i.e., tracking blocks of the virtual machines (e.g., virtual machine disks or virtual volumes of the VMs) that have changed since a last backup or snapshot was requested. A changed block list may be provided upon a backup request by the backup application so that the backup application can perform a backup (e.g., incremental backup) of the virtual machine. For example, the backup application may issue a request to the virtual machine manager for a backup of a virtual machine. The virtual machine manager may respond by generating a snapshot on the storage of a virtual machine disk used by the virtual machine and providing a list of blocks of the virtual machine disk that have changed since a last backup. This allows the backup application to backup only the changes and exclude or omit from the backup other blocks that have not changed since the last backup.

The backup media provides a target for the backup or copying of data from the primary storage. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology. An example of a backup target is Data Domain (DD) as provided by Dell EMC.

The backup management server may include a general purpose computer with software and hardware such as a processor, memory, storage, network interface card (NIC), and so forth. The backup management server may include a backup application 136 which coordinates with the virtual machine manager, a backup proxy server, storage controller, or combinations of these to backup or copy data from primary storage to the backup media. The backup management server and backup proxy server may be the same or different server. In an embodiment, the backup proxy server (or backup management server) may mount a disk (e.g., virtual disk or volume) from primary storage, read the data, and copy the data to the backup media for a backup. The backup workload can be offloaded from production virtual machine hosts and onto the backup proxy. An example of a backup proxy is the NetWorker Virtual Proxy (also referred to as vProxy) by Dell EMC that performs backups for VMware virtual machines.

The backup application server may maintain a schedule at which backups should be performed. At a designated backup window time, the backup application server may issue a request to the virtual machine manager for a backup of a virtual machine. In response to the backup request, the virtual machine manager may quiesce the virtual machine and take a snapshot of one or more disks (e.g., virtual disks) on the primary storage system and associated with the virtual machine. The virtual machine manager may notify the backup application of completion of the snapshot on the primary storage system. The backup application may copy (or instruct the primary storage system to copy) data from the primary storage system over the network to the backup media. The backup application may instruct the virtual machine manager to delete the snapshot.

It should be appreciated that the components and modules shown in FIG. 1 may be functional and there can be many different hardware and software configurations. For example, in another specific embodiment, there can be a backup agent at the host. A backup agent may be installed in each virtual machine hosted by a host. A backup agent in a particular virtual machine may coordinate with the backup application to backup a particular virtual disk associated with the particular virtual machine. In another specific embodiment, backups may be performed without there being a backup agent at each virtual machine.

Many backup solutions for virtual machines in a VMware environment use the VADP API for backup. This VADP API was created to allow a proxy virtual machine to create snapshot disks of target virtual machines and use a changed block (CBT) feature for incremental backup of the target virtual machine's disks. Backups using VADP suffer from input/output (I/O) performance degradation caused by the creation of VMDK snapshots. The following is a root cause analysis (RCA) of performance degradation caused by VMDK snapshots and a discussion of systems and techniques that can address the problem.

Figure 2:
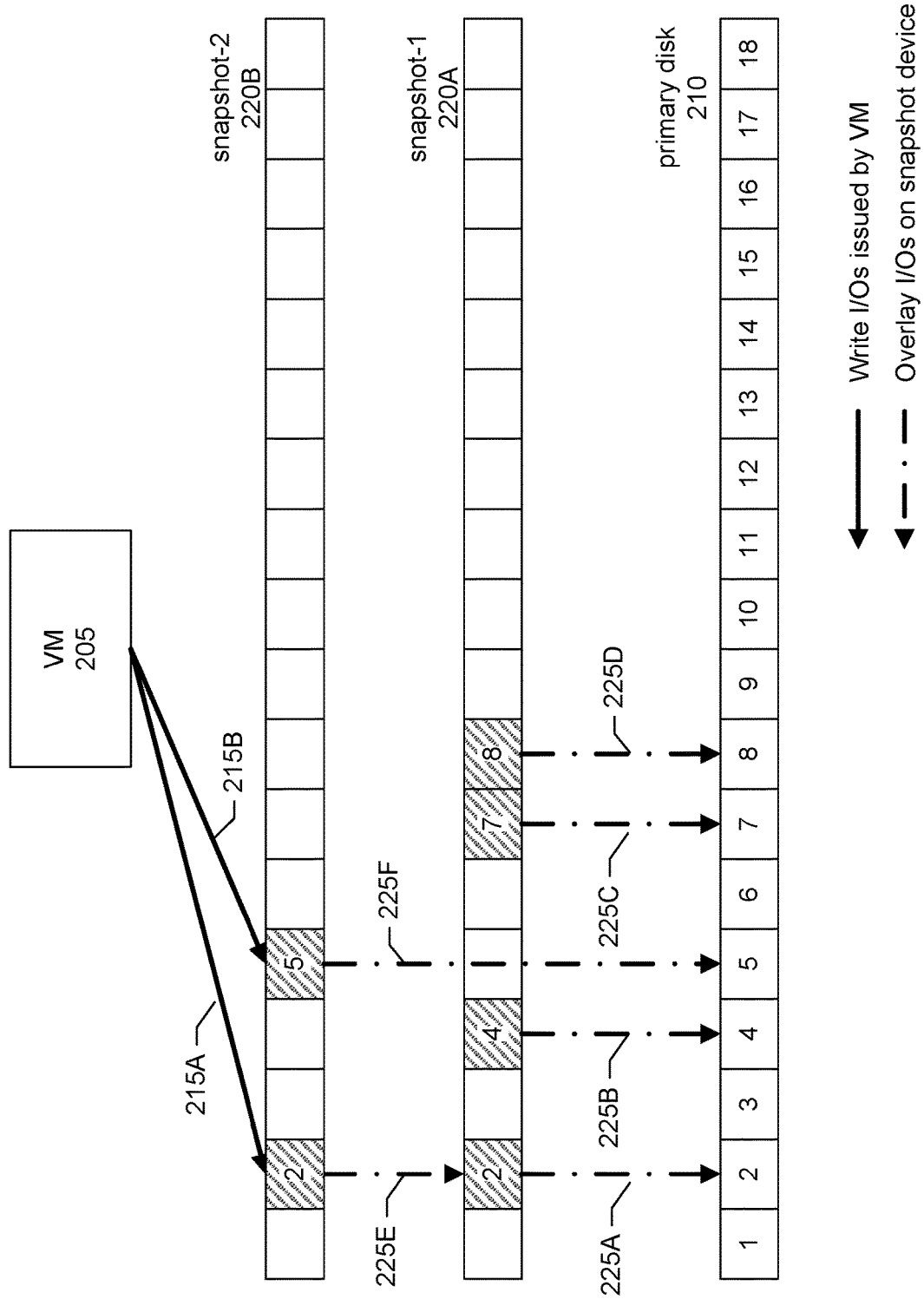
FIG. 2 shows an example of operations of a reverse snapshot, according to one or more embodiments.

FIG. 2 shows an example of reverse snapshot disk operations in a virtualized environment. As shown in the example of FIG. 2, there is a virtual machine 205 and primary disk 210. The virtual machine may be referred to as a guest virtual machine. Write I/Os 215A,B are issued by the guest virtual machine to the primary disk. In a virtualized environment that uses reverse snapshot disks (such as a VMware virtual environment) the snapshot disk front-ends and absorbs all new writes from the guest virtual machine while maintaining the contents of the primary volume static.

FIG. 2 shows the primary disk as being the base VMDK that was being used by the guest virtual machine. Subsequently, a first snapshot (snapshot-1) 220A was taken which created another VMDK. In this example, the guest virtual machine issued writes to block numbers 2, 4, 7, and 8 after creating the first snapshot-1 and those writes were only written to the first snapshot-1's VMDK. A snapshot may be referred to as a sparse disk and the primary disk may be referred to as a full disk.

Notice how the primary disk remains unmodified in the presence of snapshots. Removal of first snapshot-1 220A requires that all I/Os front-ended by the snapshot VMDK be written 225A-D to the primary disk.

VMware allows creation of snapshot of a snapshot, such as a second snapshot-2 220B, as shown in FIG. 2; and the same algorithm repeats in the context of the second snapshot-2. Removal of a snapshot VMDK generally results in triggering a large number of I/Os to read all front-ended "writes" on the snapshot disk and write them back 225E,F to the primary disk. In FIG. 2, I/Os 225A-F are shown with dash-dot lines indicate such overlay I/Os on the snapshot device.

The problem of increased I/O overhead is further compounded because virtual machine generated I/Os are typically integral multiples of sector units (typically ranging 512 bytes to 4 KB). More particularly, given that a virtual machine disk (e.g., VMDK) can be several gigabytes (GBs) or even terabytes (TBs) in size, some virtualization systems and programs, such as VMware, perform an optimization in how the snapshot device front-ends writes. Instead of tracking whether each sector of the primary disk has been front-ended by the snapshot device, these virtualization systems group multiple sectors of the primary disk to create a segment (typically 64 KB to 128 KB) and tracks whether an entire segment has been front-ended by the snapshot device.

Grouping together of sectors of the primary disk to create segments, however creates a write-amplification problem that can seriously degrade I/O performance of the virtual machine during the existence of a snapshot and even more so during its removal. This is so because a single sector write by the guest virtual machine requires the virtualization program to populate an entire segment's worth of data on the snapshot device. This is achieved by reading the fractured regions of the segment from the primary disk and issuing a combined write to the snapshot device.

Figure 3:
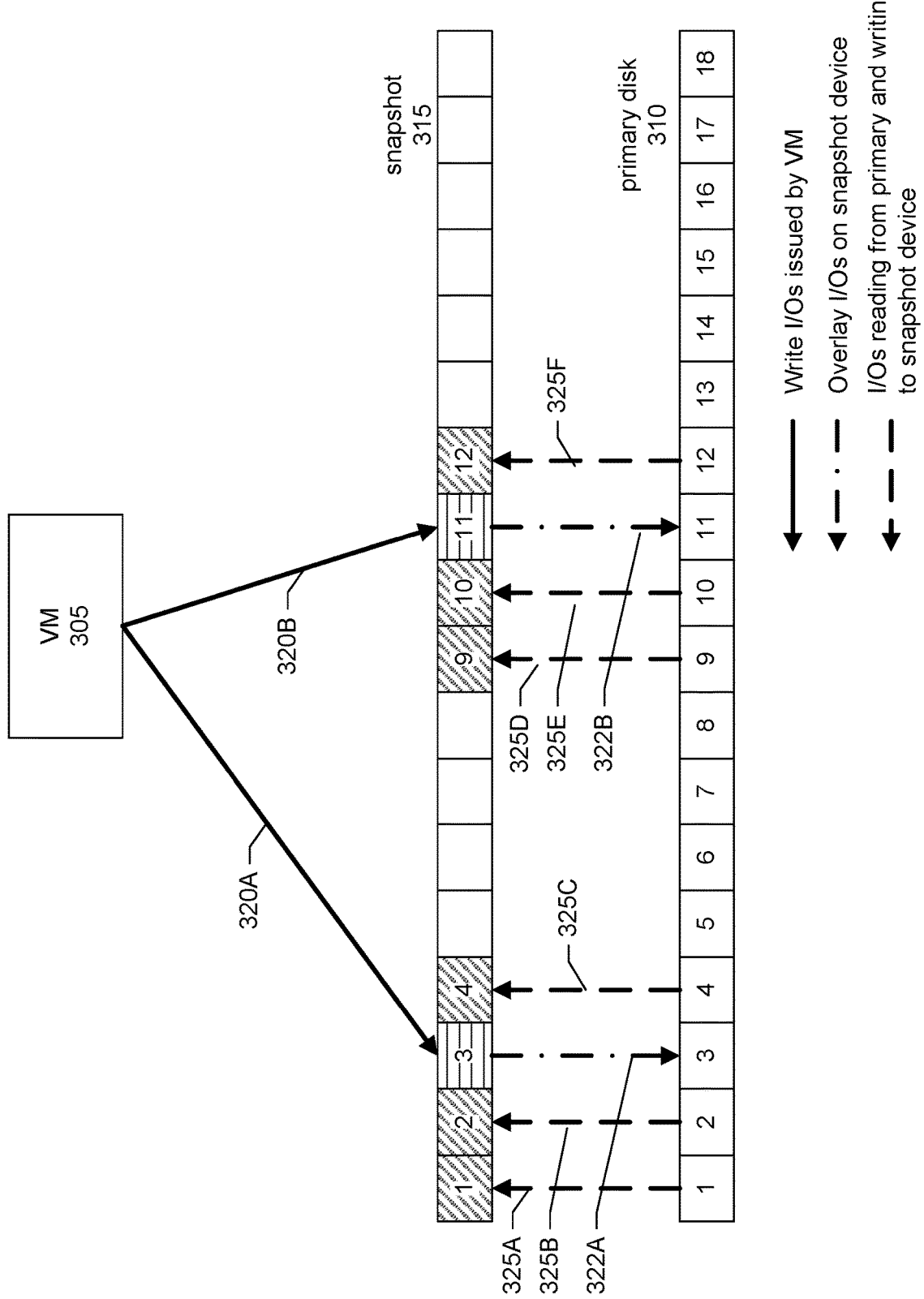
FIG. 3 shows another example of operations of a reverse snapshot, according to one or more embodiments.

FIG. 3 shows a block diagram illustrating the additional overhead of front-ending segment worth of writes on the snapshot device. In the example of FIG. 3, there is a virtual machine 305, a primary disk 310, and a snapshot (snapshot-1) 315 having a segment size of 4 sectors. In this example, the virtual machine issued a write 320A to sector 3 after snapshot-1 315 was created. Instead of write 320A being made to the primary disk, write 320A is made to snapshot-1 315. A dash-dot arrow 322A indicates the write being made from snapshot-1 to the primary disk after removal of snapshot-1.

As discussed, however, in an embodiment, the grouping of sectors into segments creates write-application problems that can severely degrade I/O performance. Consequently, when the VM issued a write to sector 3 after snapshot-1 was created, additional reads of sectors 1, 2, and 4 were required from the primary disk to store a segment's worth of front-ended data on snapshot device. These additional reads of sections 1, 2, and 4 from the primary disk to snapshot-1 are indicated by I/O arrows 325A-C shown in broken lines.

In other words, a modification to block (or sector) 3 on the snapshot pulled blocks 1, 2, and 4 from the primary disk as shown by I/O arrows 325A-C. Similarly, a write 320B to block 11 on the snapshot pulled blocks 9, 10, and 12 from the primary disk to the snapshot as shown by I/O arrows 325D-F because block 11 in this example is part of another segment that includes blocks 9, 10, and 12.

Front-ending a segment's worth of new writes on a snapshot VMDK reduces the overheads required to track modified regions on snapshot devices. This is important for various virtualization platforms, such as VMware, as the snapshots can potentially be long-lived and therefore any optimization done to reduce resources to manage snapshots is extremely important.

However, deletion of a snapshot now places an increased load on the storage array since there is more data to be read from the snapshot device and migrated to the primary volume (disk). Thus, small random writes to the snapshot device can cause up to twice as many extra reads on the primary to front-end a segment's worth of data on the snapshot device. Write amplification causes by segment-sized front-ending of writes on a snapshot device can cause an additional 2× number of reads on the primary disk.

For example, in an embodiment, a virtual machine is associated with a primary disk having sectors or blocks. The sectors are grouped into a set of segments. Each segment is defined as having two or more sectors. A snapshot is created of the primary disk such as for backup. An IO write issued by the virtual machine to a sector of the primary disk is instead made to a corresponding sector of the snapshot, the corresponding sector of the snapshot being a sector in a particular segment. The write to the corresponding sector of the snapshot triggers reads on the primary disk of other sectors in the particular segment for storage of the data in the other sectors on the primary disk onto the snapshot. Upon removal of the snapshot, the IO write issued by the virtual machine and written to the snapshot is written to the primary disk along with the other data of the other sectors in the particular segment.

It has been observed that the use case presented by a VADP-based proxy backup engine when creating snapshot volumes to read CBT denoted regions of the primary volume represents a case that does not require long term retention of the snapshot and is therefore not optimized in VMware.

As discussed, in a specific embodiment, each time a snapshot is created, the primary disk incurs up to 2 times the number of extra reads to make a segment's worth of data that can then be front-ended by the snapshot disk. This extra 2× I/O is required for all disks of a virtual machine and for all virtual machines that are being backed-up in parallel. Consequently, the storage subsystem becomes overwhelmed with all the extra I/Os and the input/output operations per second (IOPS) available to the virtual machine for its write I/Os becomes severely reduced.

An overwhelmed I/O subsystem also leads to increased latency of write I/Os thus degrading virtual machine write performance. The problem worsens when the snapshot is removed as all the front-ended writes on the snapshot devices needs to be merged back (see, e.g., 225A-F, FIG. 2; 322A-B, FIG. 3) and while that is ongoing the proxy backup engine picks new virtual machines for backup. The I/O activity continues to accumulate with each new virtual machine backup and the cumulative effect of the increased I/O activity leads to longer and longer delays in processing.

Previous approaches to reduce snapshot overheads have proved unworkable. For example, reducing snapshot segment size does not reduce write-amplification I/Os created by snapshots, except by making the I/Os smaller in size and that is at the cost of increased resources to track dirty regions on the snapshot disk. Consequently, virtual machine backup vendors have been unable to alleviate the snapshot caused degradation on VMware and other similar virtualization platforms. There is a need for improved systems and techniques to reduce load on primary storage arrays—especially in cases of hard disk storage arrays. For example, many small to medium-sized enterprises (SMEs) still rely on hard disk-based storage arrays as the primary storage for their virtual machines rather than flash arrays because of costs. Flash storage can offer better performance than hard disks, but is much more expensive.

The snapshots created by a proxy virtual machine as part of VADP backup workflow are particularly inefficient for the backup use case. It has been observed that the snapshot VMDK helps to ensure that the regions of the primary disk (as earmarked 'modified' in its associated CBT) are not further modified by writes from the guest virtual machine, during backup. The snapshot device is front-ending all writes from the guest virtual machine to help ensure that the CBT marked regions of the primary disk do not get modified. And therein lies the inefficiency.

In a specific embodiment, systems and techniques are provided to avoid keeping a snapshot around over the bulk of the duration of the incremental (or full) backup. In a specific embodiment, the process involves completing the backup without a snapshot and then taking recourse to a delta snapshot for the purpose of achieving consistency.

In a specific embodiment, a snapshot (e.g., snapshot numbered $S_k$) is taken at the start of the backup (a term hereinafter referring to either a full or incremental backup). As soon as snapshot $S_k$ is created, a changed block tracking (CBT) list between $S_k$ and $S_{k-1}$ (i.e., a last snapshot before snapshot $S_k$) is obtained by the backup proxy server (e.g., vProxy). Let's denote this CBT list as $CBT_{list1}$. The snapshot $S_k$ is now deleted. After deleting $S_k$, the backup proxy (e.g., vProxy) initiates a backup (say at time $T_1$) using $CBT_{list1}$ to track source data to be backed up and stores the data to the backup media (e.g., Data Domain). As can be seen, this backup is not consistent but happens without the existence of a VADP snapshot over the duration of the backup.

As discussed, the backup just completed is not consistent. Let's say the data transfer completes at $T_2$. In order to make the backup consistent, another snapshot $S_{k+1}$ is taken at time $T_2$ and the CBT list between snapshots $S_k$ and $S_{k+1}$ is obtained. Let's denote this CBT list as $CBT_{list2}$. $CBT_{list2}$ includes only those blocks that were modified by the target virtual machine (that is being backed up) between time intervals $T_1$ and $T_2$. $CBT_{list2}$ will be a tiny fraction of the size of $CBT_{list1}$. This is so because:

1) $CBT_{list1}$ will, in the case of a full backup, denote the entire list of blocks of the primary volume that was ever modified by the target virtual machine (e.g., virtual machine that is being backed up). This will typically constitute anywhere from about 70 percent to about 100 percent of the primary disk depending on how much it has been used since it was created.

2) $CBT_{list1}$ will, as in the case of incremental backup, denote the list of blocks of the primary device that were modified between two backup intervals (typically 24 hours). $CBT_{list2}$, however, includes only those blocks that were modified over the duration of the backup of blocks denoted by $CBT_{list1}$ which can generally vary from a couple of hours to a few minutes depending on whether the backup was a full backup or incremental backup. Better still, the performance of the backup for $CBT_{list1}$ is much faster than would be the case when a snapshot is present, since the snapshot by its mere presence can introduce around 35 percent overhead for I/O.

Continuing the modified backup process, the backup proxy (e.g., vProxy) now completes an incremental backup of blocks listed in $CBT_{list2}$, which may be referred to as the consistency phase. This backup contains a very small set of blocks and occurs in the presence of snapshot $S_{k+1}$. The blocks so read are merged into the previous backup using virtual synthesis. After $CBT_{list2}$ blocks have been read, snapshot $S_{k+1}$ is deleted and this concludes the backup process. The total time of the backup is therefore the time taken from creation of snapshot $S_k$ to deletion of snapshot $S_{k+1}$.

One reason why this algorithm is significantly faster than the traditional algorithm is because the bulk of the backup happens without the presence of a VADP snapshot. The consistency phase of the algorithm backups up only a very small list of blocks during the presence of $S_{k+1}$. Deletion of $S_{k+1}$ is, as a result, very fast since the snapshot existed over a very small duration and therefore did not "soak" up or "front end" a lot of writes.

Another benefit of the algorithm is that it can be easily integrated into existing backup applications. In a specific embodiment, there is the additional step of completing a backup without the presence of a snapshot followed by the "consistency" step.

Table A below shows a flow of the backup algorithm according to one or more embodiments.

TABLE A

| Step | Description |
|---|---|
| 1 | Take a snapshot $S_1$ of the VMDKs of a VM at the start of the backup and obtain the CBT list $CBT_{list1}$ of blocks up to creation of $S_1$. |
| 2 | Immediately delete $S_1$. |
| 3 | Initiate a backup of all blocks in $CBT_{list1}$ and transfer them to backup media. |
| 4 | Take another snapshot $S_2$ and compute CBT list of blocks modified between $S_1$ and $S_2$. Call this list $CBT_{list2}$. |
| 5 | Backup all blocks in $CBT_{list2}$ and merge these blocks with the previous backup taken in step 3 above. |
| 6 | Delete $S_2$ after blocks from $CBT_{list2}$ have been read. The merging of blocks from $CBT_{list2}$ with those from $CBT_{list1}$ can be done after $S_2$ has been deleted as possibly as an asynchronous step. |
| 7 | As an optimization, if $CBT_{list2}$ does not intersect with $CBT_{list1}$, none of the blocks in $CBT_{list2}$ need to be backed up. The $CBT_{list2}$, however, may be preserved or saved in backup media to be used for the next backup. |

Figure 4:
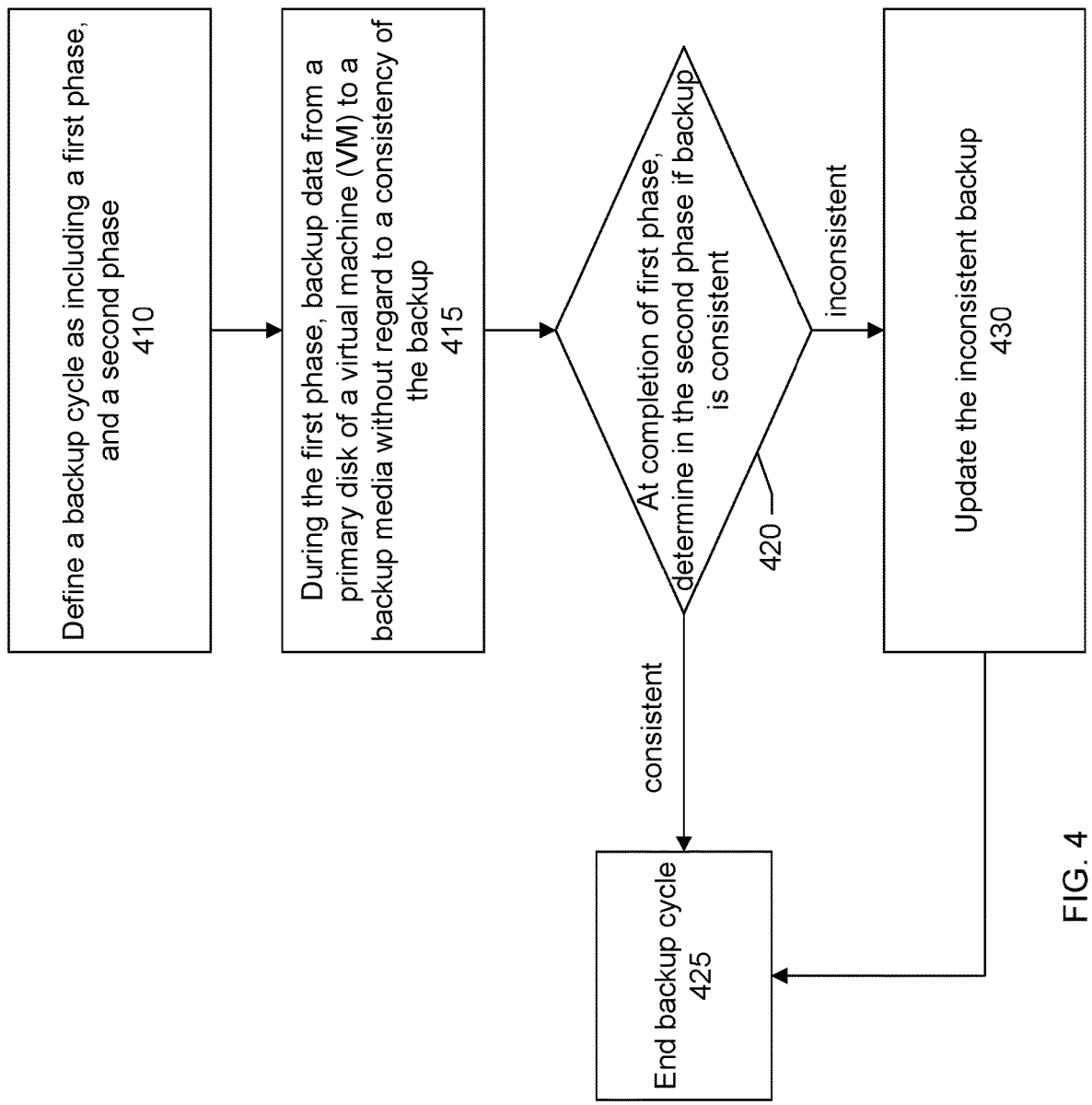
FIG. 4 shows an overall flow of a process for backups, according to one or more embodiments.

FIG. 4 shows another overall flow for backing up according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application, or based on the data.

In a step 410, a backup cycle is defined as including a first phase, and a second phase, after the first phase. In a step 415, during the first phase, data is copied from a primary disk of a virtual machine without regard to a consistency of a backup. More particularly, during the first phase, the virtual machine may continue to issue I/O writes to the primary disk in which the I/O writes are written to the primary disk. For example, during the first phase, a block on the primary disk may be copied to the backup media. After the block has been copied to the backup media and before the backup is complete, the block on the primary disk may be written to again, thereby rending the block inconsistent with other blocks on the primary disk backed up.

In a step 420, upon completion of the first phase, a determination is made in the second phase as to whether the backup is consistent. If the backup is determined to be consistent, the second phase and backup cycle ends (step 425). If the backup is determined to be inconsistent, the inconsistent backup is updated to make the backup consistent (step 430). Once the backup has been made consistent, the second phase and backup cycle ends (step 425).

Figure 5:
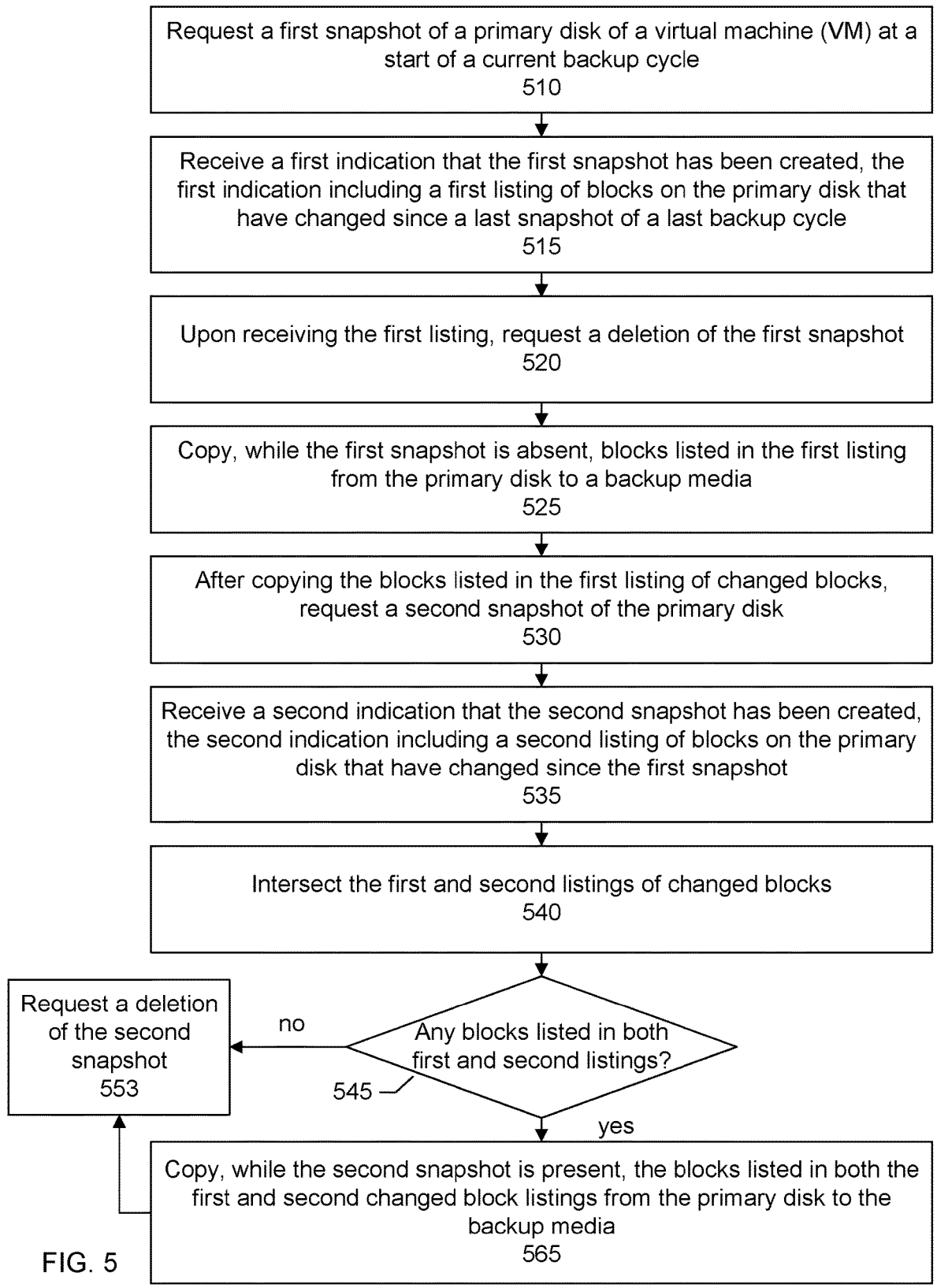
FIG. 5 shows further detail of a flow for backups, according to one or more embodiments.

FIG. 5 shows a further detail of a flow for backing up according to one or more embodiments. In a step 510, at a scheduled backup time or on-demand, a request is issued for a first snapshot of a primary disk of a virtual machine. The request is issued at a start of a current backup cycle. For example, the request may be issued by a backup application to a virtual machine manager. In a specific embodiment, the snapshot request may form part of a request for a backup of a virtual machine. The virtual machine manager, upon receipt of the request, then generates a snapshot of the primary disk associated with the virtual machine to be backed up to help ensure a consistent (e.g., crash-consistent) backup. As part of the snapshot generation, the virtual machine manager may quiesce the virtual machine and freeze all I/O to disk to establish a consistent state of the virtual machine. Since a snapshot is not an actual copy of data, the snapshot can be generated very quickly. Thus, there is relatively very little disruption to the operation of the virtual machine during snapshot creation.

In a step 515, a first indication is received that the first snapshot has been created. The first indication includes a first listing of blocks on the primary disk that have changed since a last snapshot of a last backup cycle. For example, as discussed, in a specific embodiment, the virtual machine manager may provide a changed block tracking module. The CBT module tracks the changes the various virtual disks used by the various virtual machines. When the virtual machine manager receives a backup request from a backup application (or backup proxy) for a virtual machine, the virtual machine manager may generate a snapshot of a virtual machine disk associated with the virtual machine. Once the snapshot has been generated, the virtual machine manager may notify the backup proxy and provide the backup proxy with a listing of blocks on the virtual machine disk that have changed since a last snapshot or since a last backup was requested.

In a step 520, upon receiving the first listing of blocks, a request is issued for a deletion of the first snapshot. More particularly, immediately after the first snapshot is created and the first listing of blocks is received, the backup application may issue a request to the virtual machine manager to delete the first snapshot. The first snapshot may be deleted before any I/O writes have been issued by the virtual machine being backed up and written to the snapshot. In the event that an I/O write is issued and written to the snapshot, the I/O write is written to the primary disk upon deletion of the first snapshot. Thus, the I/O write will not be lost with the deletion of the first snapshot.

In a step 525, while the first snapshot is absent, blocks listed in the first listing of blocks are copied from the primary disk to a backup media. That is, the blocks are copied from the primary disk and not the first snapshot since the first snapshot does not exist. During the copying of blocks listed in the first listing, the virtual machine may continue to be allowed or permitted to issue I/O writes. Since the first snapshot has been deleted, these I/O writes may be made to the primary disk. Steps 510-525 may form a first phase of the backup cycle. In other words, the copying of blocks from the first listing occurs while the first snapshot is not present as the first snapshot was deleted. The backup or copying of blocks occurs from the primary disk as the source (not snapshot) and while changes are permitted or allowed to be made to the primary disk by the associated virtual machine. That is, a state of the virtual machine may be live during the copying.

FIG. 6 shows a block diagram of the first phase of the backup cycle. FIG. 6 shows a virtual machine 605 and a primary disk 610 of the virtual machine. A first snapshot 615 has been requested (step 510, FIG. 5), such as via a request to backup the virtual machine. The creation of the first snapshot is accompanied by a first listing of blocks 620 on the primary disk that have changed since a last snapshot or backup was requested (step 515).

As an example, consider that the first listing of changed blocks lists blocks 2, 4, 7, 8, and 9. Upon receipt of the first listing of blocks, the first snapshot is immediately deleted as indicated by an "X" that has been superimposed over the first snapshot (step 520); and the backup proceeds—in the absence of first snapshot—with the reading and copying 625 of blocks 2, 4, 7, 8, and 9 from the primary disk to a backup media 630 (step 525).

As discussed, during the copying of the blocks listed in the first listing, the virtual machine may continue to issue I/O writes which are then written to the primary disk because the first snapshot is no longer present. Consider, as an example, that the virtual machine issues I/O writes to blocks 8, 14, and 16 as indicated by arrows 635A-C. In this example, blocks 14 and 16 are not part of the blocks in the current backup. Block 8, however, is part of the current backup. Thus, the current backup may be inconsistent. For example, block 8 may be modified or changed during the backup. As a result, block 8 may be inconsistent with respect to the other blocks in the current backup.

Referring back now to FIG. 5, in a step 530, after copying the blocks listed in the first listing while first snapshot is absent, a request is issued for a second snapshot of the primary disk of the virtual machine. For example, the request may be issued by the backup application to the virtual machine manager. The second snapshot request may form part of a second request for a backup of the virtual machine. The virtual machine manager, upon receipt of the request, may then generate another or second snapshot of the primary disk associated with the virtual machine to be backed up.

In a step 535, a second indication is received that the second snapshot has been created. The second indication includes a second listing of blocks on the primary disk that have changed since the first snapshot (or since the last backup was requested).

In a step 540, the first and second listings of changed blocks are intersected to identify whether there are any blocks listed in both the first and second listings (step 545). In other words, a differencing is created between the first and second snapshots. If no blocks are listed in both the first and second listings (e.g., intersection equals a null result), a determination may be made that the backup is consistent and a request is issued to delete the second snapshot (step 553) to mark an end of the current backup cycle.

Alternatively, if there are one or more blocks listed in both the first and second listings, a determination may be made that the backup is not consistent. These one or more blocks may be referred to as common blocks as they are present in both the first and second changed block lists. The process then advances to make the backup consistent. Specifically, in a step 565, the backup application (or backup proxy) copies—while the second snapshot is present—the one or more blocks listed in both the first and second listings from the primary disk to the backup media to update the backup with changes or modifications made to the primary disk during the copying of blocks listed in the first listing. In other words, the second snapshot may be maintained during the copying of blocks listed in both the first and second listings of changed blocks. Thus, I/O writes issued by the virtual machine during the copying of blocks listed in both the first and second listings are written to the second snapshot and not the primary disk.

After the copying of the one or more blocks listed in both the first and second listings has been completed, a request is issued to delete the second snapshot (step 553). Any I/O writes issued by the virtual machine during the copying of blocks listed in both the first and second listings of changed blocks and written to the second snapshot are written to the primary disk upon deletion of the second snapshot. Steps 530-565 may form a second phase of the backup cycle.

FIG. 7 shows a block diagram of the second phase of the backup cycle. As in FIG. 6, there is virtual machine 605 and primary disk 610. A second snapshot 715 has been requested (step 530, FIG. 5), such as via another request to backup the virtual machine. The creation of the second snapshot is accompanied by a second listing blocks 720 on the primary disk that have changed since a last backup or snapshot was requested (step 535)—the last snapshot thereby being the first snapshot.

In this example, the second listing of changed blocks lists blocks 8, 14, and 16. An intersection or comparison is performed with the first and second listings of changed blocks to determine whether there are any blocks listed in both the first and second listings (steps 540, 545). In this example, block 8 is listed in both the first and second listings of changed blocks and a determination is made that the backup is not consistent. In other words, during the copying of blocks on the primary disk in the absence of the first snapshot, changes were made to the primary disk that affected the consistency of the backup (e.g., block 8). Thus, block 8 is now copied 725 to backup media 630 in order to merge or update the previously copied block 8 (step 565). The blocks listed in the second listing, but not in the first listing (e.g., blocks 14 and 16) may be omitted from the current backup cycle. The backup of blocks 14 and 16 may be postponed to a next backup cycle.

More particularly, in a specific embodiment, a method includes: requesting a first backup of a virtual machine at a beginning of a current backup cycle; receiving, in response to the first backup request, a first snapshot of a primary disk of the virtual machine and a first listing of blocks on the primary disk that have changed since a last snapshot of the primary disk before the first snapshot; deleting the first snapshot; copying, while the first snapshot is absent, blocks listed in the first listing from the primary disk to a backup media; requesting a second backup of the virtual machine for the current backup cycle; receiving, in response to the second backup request, a second snapshot of the primary disk and a second listing of blocks on the primary disk that have changed since the first snapshot; intersecting the first and second listings to determine which blocks are common to the first and second listings, and which blocks are not common to the first and second listings; for the blocks that are common, copying, while the second snapshot is present, the common blocks from the primary disk to the backup media to merge changes made to the primary disk while the first snapshot was absent, thereby making the current backup cycle consistent; and after copying the common blocks, deleting the second snapshot; and for the blocks that are not common, deleting the second snapshot without copying the not common blocks for the current backup cycle; storing identifications of the not common blocks for a next backup cycle; at the next backup cycle, requesting a third backup of the virtual machine, the next backup cycle now being a now current backup cycle, and the current backup cycle now being a previous backup cycle; receiving, in response to the third backup request, a third snapshot of the primary disk and a third listing of blocks on the primary disk that have changed since the second snapshot; deleting the third snapshot; and copying, while the third snapshot is absent, blocks listed in the third listing and the not common blocks identified in the previous backup cycle from the primary disk to the backup media.

As shown in FIG. 7, the second snapshot remains present during the copying of any blocks listed in both the first and second listings of changed blocks. Thus, I/O writes 750 issued by the virtual machine during the copying of blocks listed in both the first and second listings of changed blocks will be front-ended by the second snapshot and written to the primary disk upon deletion of the second snapshot.

As discussed, however, the duration of time over which a snapshot is present (e.g., second snapshot) is likely to be much shorter than the duration of time over which the bulk of the backup or copying occurs in which a snapshot is absent (e.g., first snapshot). As a result, I/O activity associated with front-ending "writes" on the snapshot disk is drastically reduced.

Figure 8:
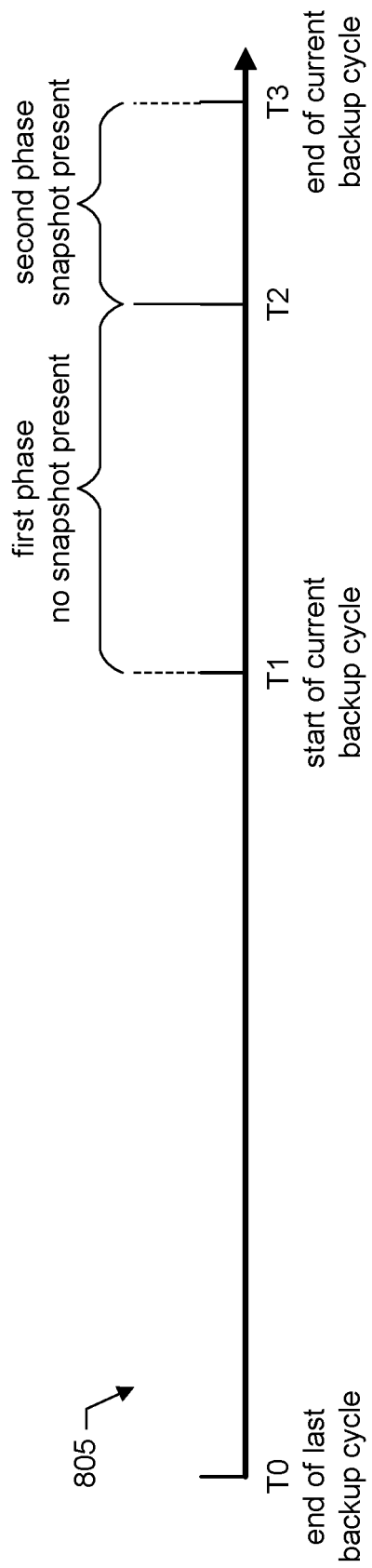
FIG. 8 shows an example of a timeline of a backup cycle, according to one or more embodiments.

For example, FIG. 8 shows a timeline 805 of backup activity. A time T0 indicates an end of a last backup cycle, a time T1 indicates a start of a current backup cycle, and a time T3 indicates an end of the current backup cycle. The frequency of backups, and thus a duration of time between the end of the last backup cycle (T0) and start of the current backup cycle (T1) may vary. For example, the enterprise may configure a backup schedule with daily backups. Thus, the duration time between the end of the last backup cycle and start of the current backup cycle may be 24 hours.

In a specific embodiment, a snapshot, e.g., first snapshot, is created at the start T1 of the current backup cycle and is accompanied by a listing of blocks, e.g., first changed block list, that have changed since a last snapshot was requested (e.g., last backup cycle). Upon receipt of the first changed block list, the first snapshot is immediately deleted and a copying of blocks from the primary disk to the backup media begins in the absence of any snapshot. As discussed, I/O writes may continue to be made to the primary disk. Thus, the backup may be inconsistent.

A time T2 marks an end of the copying of blocks listed in the first changed block list; and the creation of a second snapshot to update the backup with any changes that may have been made to the blocks listed in the first changed block list while the blocks were being backed up, thus making the backup consistent.

Specifically, the creation of the second snapshot is accompanied by a second changed block list listing blocks that have changed since the last snapshot (e.g., first snapshot at time T1 of the current backup cycle). Upon receipt of the second changed block list, a copying from the primary disk to the backup media of blocks listed in both the first and second changed block lists begins in the presence of the snapshot (e.g., second snapshot). Thus, any I/O writes are made to the second snapshot and not the primary disk to help ensure that the primary disk remains consistent during the copying of blocks listed in both the first and second changed block lists. Time T3 marks the completion of the copying of blocks listed in both the first and second changed block list to make the backup consistent.

The first phase of the backup cycle may be defined a first time period between times T1 and T2. The second phase of the backup cycle may be defined as a second time period between times T2 and T3. In an embodiment, the second time period may be substantially less than the first time period in which the bulk of the backup (or copying) occurs without the presence of a snapshot. For example, in an embodiment, a number of blocks to be backed up or copied at the start T1 of the current backup cycle, as specified in the first changed block list, reflects changes made over, for example, a 24-hour period in the case of daily backups. A number of blocks to be backed up or copied at the start of T2 of the current backup cycle reflects changes made over the time required to copy the blocks listed in the first changed block list; and this number of blocks is likely to be relatively small as compared to the number of blocks to be copied at the start of the current backup cycle T1.

For example, it may take 20 minutes to copy a first number of blocks that have changed over the 24-hour period as specified in the first changed block list. The second changed block list (which reflects changes made over that 20-minute period) is likely to include a fewer number of blocks—and the number of blocks that were part of the backup and that need to be made consistent is likely to be even fewer still (e.g., substantially less than the first number of blocks). Thus, the duration of time over which copying occurs in the presence of a snapshot (e.g., second snapshot) is relatively short. In turn, the amount of overhead I/O activity on the storage array due to snapshot processing (e.g., writing to primary disk of write I/Os front-ended by the snapshot) is likewise reduced as the amount of degradation is proportional to the amount of time that a snapshot is present. In an embodiment, systems and techniques are thus provided to reduce the time period for which a snapshot is present which, in turn, reduces the time period associated with degradation of the storage array.

In a specific embodiment, a backup cycle includes a first phase, and a second phase, after the first phase. The first phase includes copying blocks listed in a first changed block listing from the primary disk to the backup media—without the presence of a snapshot. After the first phase, a second changed block listing is received that accompanies a second snapshot. Determinations are made during the second phase whether a set of conditions exist.

Figure 9:
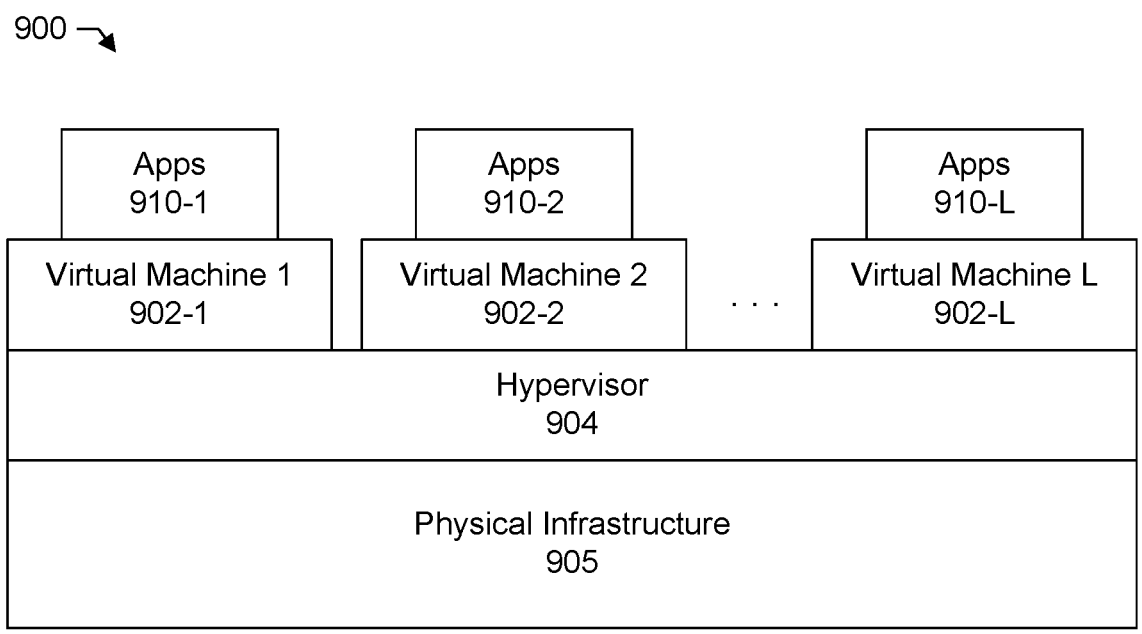
FIG. 9 shows a block diagram of a processing platform that may be utilized to implement at least a portion of an information processing system, according to one or more embodiments.

A first condition exists when a particular block is listed in the first and second listings, the particular block having been marked as changed since a last backup cycle and during the first phase. A second condition exists when the particular block is listed in the first listing and is not listed in the second listing, the particular block having been marked as changed since a last backup cycle and not marked as changed during the first phase. A third condition exists when the particular block is not listed in the first listing and is listed in the second listing, the particular block not having been marked as changed since the last backup cycle and having been marked as changed during the first phase. If the first condition exists, the copying of the particular block from the primary disk to the backup media is repeated to update a corresponding block on the backup media with changes made to the first block during the first phase. If the second condition exists, the copying of the particular block from the primary disk to the backup media is not repeated. If the third condition exists, the particular block is not copied from the primary disk to the backup media for the current backup cycle. The particular block may instead be copied to the backup media during a next backup cycle after the current backup cycle FIG. 9 shows an example of an information processing platform comprising cloud infrastructure 900 in which snapshot-less backups may be used. The cloud infrastructure 900 comprises a combination of physical and virtual processing resources that may be utilized to implement at least a portion of information processing system 100 (FIG. 1). The cloud infrastructure 900 comprises virtual machines (VMs) 902-1, 902-2, . . . 902-L implemented using a hypervisor 904. The hypervisor runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor.

Although only a single hypervisor is shown in the embodiment of FIG. 9, the system may include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement the hypervisor and possibly other portions of the information processing system in one or more embodiments is the VMware® vSphere® which may have an associated virtual infrastructure management system such as the VMware® vCenter™. The underlying physical machines may comprise one or more distributed processing platforms that include one or more storage systems.

Figure 10:
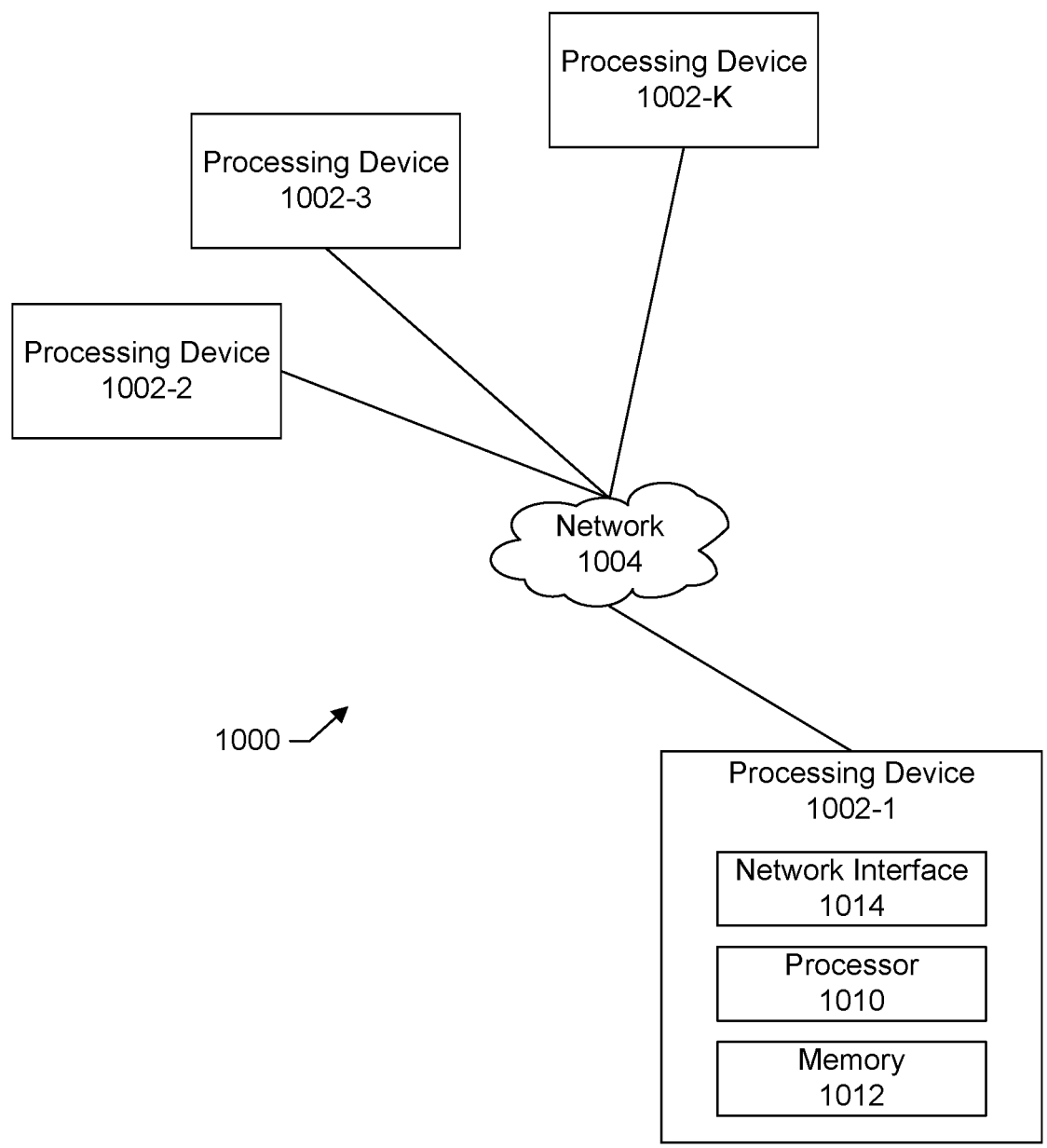
FIG. 10 shows another block diagram of a processing platform that may be utilized to implement at least a portion of an information processing system, according to one or more embodiments.

As is apparent from the above, one or more of the processing modules or other components of the system may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 11:
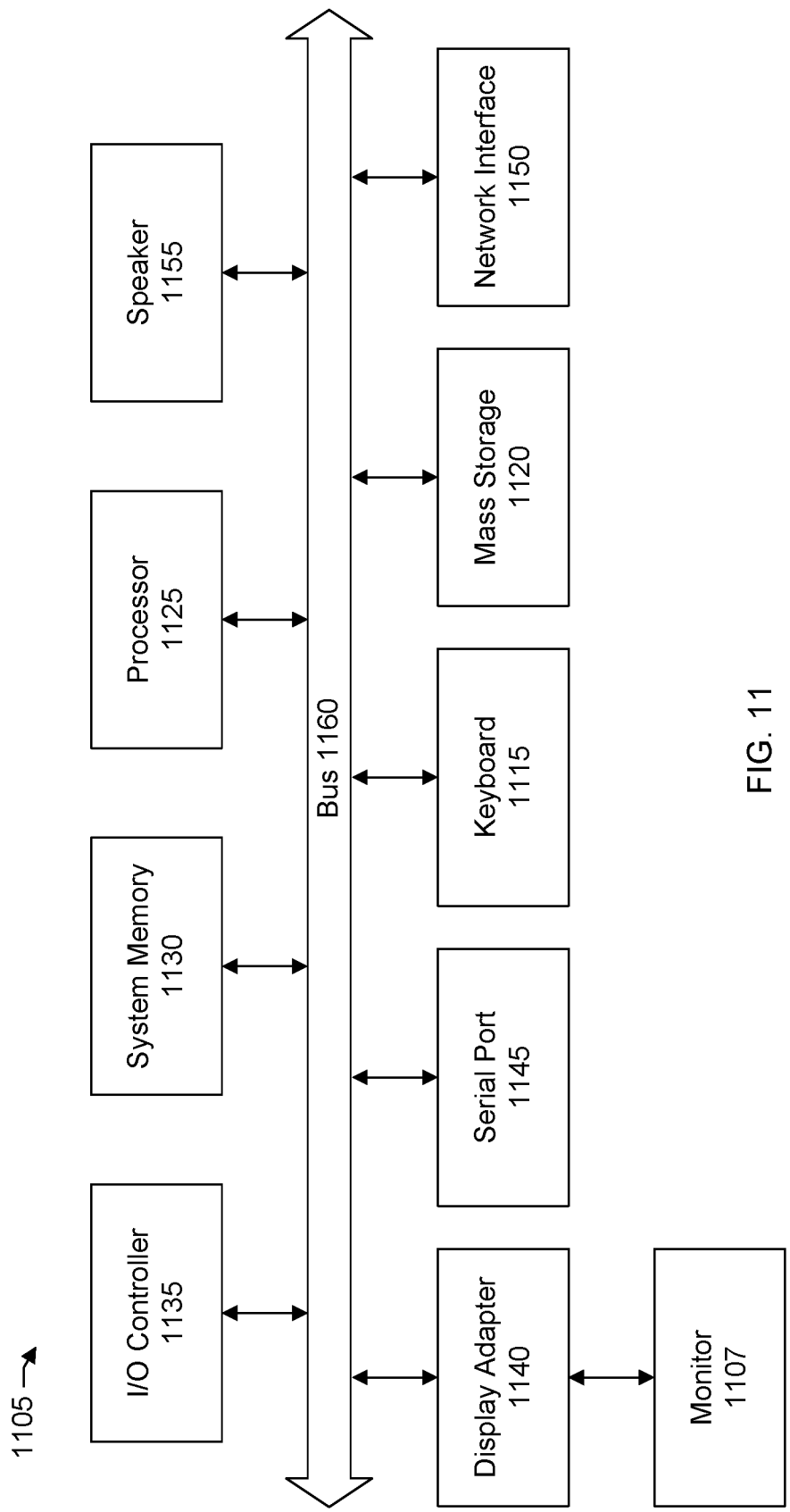
FIG. 11 shows a block diagram of a computer system suitable for use with the system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In a specific embodiment, there is a system comprising: a processor; and memory configured to store one or more sequences of instructions which, when executed by the processor, cause the processor to carry out the steps of: requesting a first snapshot of a primary disk of a virtual machine at a beginning of a current backup cycle; receiving a first indication that the first snapshot has been created, the first indication comprising a first listing of blocks on the primary disk that have changed since a last snapshot, before the first snapshot, was requested; requesting deletion of the first snapshot; copying, while the first snapshot is absent, blocks listed in the first listing of changed blocks from the primary disk to a backup media; after copying the blocks listed in the first listing of changed blocks, requesting a second snapshot of the primary disk for the current backup cycle; receiving a second indication that the second snapshot has been created, the second indication comprising a second listing of blocks on the primary disk that have changed since the first snapshot was requested; and copying, while the second snapshot is present, blocks listed in both the first and second listings of changed blocks from the primary disk to the backup media to merge changes made to the primary disk while the first snapshot was absent, thereby making the current backup cycle consistent.

In an embodiment, the processor carries out the steps of: allowing the virtual machine to write to the primary disk during the copying of blocks listed in the first listing; and not allowing the virtual machine to write to the primary disk during the copying of blocks listed in both the first and second listings, wherein during the copying of blocks listed in both the first and second listings, writes by the virtual machine are stored in the second snapshot.

In an embodiment, the first snapshot does not store writes by the virtual machine because the first snapshot is deleted immediately after the receiving an indication that the first snapshot has been created.

In an embodiment, a first duration of time is between the request for the first snapshot and the second snapshot, a second duration of time is between the current backup cycle and a last backup cycle, wherein the first duration of time corresponds to an amount of time required to copy the blocks listed in the first listing from the primary disk to the backup media, and during which the virtual machine is allowed to write to the primary disk, and wherein the first duration is less than the second duration.

In an embodiment, the process carries out the steps of: during the copying of blocks listed in the first listing, allowing the virtual machine to make changes to the primary disk, the changes including changes to the blocks listed in the first listing; and during the copying of blocks listed in both the first and second listings, not allowing the virtual machine to make changes to the primary disk.

In an embodiment, the current backup cycle comprises a first phase, and a second phase, after the first phase, the first phase comprising copying the blocks listed in the first listing from the primary disk to the backup media, and wherein the processor carries out the steps of: determining, during the second phase, whether a plurality of conditions exist, wherein a first condition exists when a particular block is listed in the first and second listings, the particular block having been marked as changed since a last backup cycle and during the first phase, a second condition exists when the particular block is listed in the first listing and is not listed in the second listing, the particular block having been marked as changed since a last backup cycle and not marked as changed during the first phase, and a third condition exists when the particular block is not listed in the first listing and is listed in the second listing, the particular block not having been marked as changed since the last backup cycle and having been marked as changed during the first phase, if the first condition exists, repeating the copying of the particular block from the primary disk to the backup media to update a corresponding block on the backup media with changes made to the first block during the first phase; if the second condition exists, not repeating the copying of the particular block from the primary disk to the backup media; and if the third condition exists, not copying the particular block from the primary disk to the backup media for the current backup cycle.

In an embodiment, the first snapshot is deleted before copying the blocks listed in the first listing.

In another specific embodiment, a method comprises: requesting a first snapshot of a primary disk of a virtual machine at a beginning of a current backup cycle; receiving a first indication that the first snapshot has been created, the first indication comprising a first listing of blocks on the primary disk that have changed since a last snapshot, before the first snapshot, was requested; requesting deletion of the first snapshot; copying, while the first snapshot is absent, blocks listed in the first listing of changed blocks from the primary disk to a backup media; after copying the blocks listed in the first listing of changed blocks, requesting a second snapshot of the primary disk for the current backup cycle; receiving a second indication that the second snapshot has been created, the second indication comprising a second listing of blocks on the primary disk that have changed since the first snapshot was requested; and copying, while the second snapshot is present, blocks listed in both the first and second listings of changed blocks from the primary disk to the backup media to merge changes made to the primary disk while the first snapshot was absent, thereby making the current backup cycle consistent.

In another specific embodiment, there is a computer program product, comprising a non-transitory computer-readable medium having a computer-readable program code embodied therein, the computer-readable program code adapted to be executed by one or more processors to implement a method comprising: requesting a first snapshot of a primary disk of a virtual machine at a beginning of a current backup cycle; receiving a first indication that the first snapshot has been created, the first indication comprising a first listing of blocks on the primary disk that have changed since a last snapshot, before the first snapshot, was requested; deleting the first snapshot; copying, while the first snapshot is absent, blocks listed in the first listing of changed blocks from the primary disk to a backup media; after copying the blocks listed in the first listing of changed blocks, requesting a second snapshot of the primary disk for the current backup cycle; receiving a second indication that the second snapshot has been created, the second indication comprising a second listing of blocks on the primary disk that have changed since the first snapshot was requested; and copying, while the second snapshot is present, blocks listed in both the first and second listings of changed blocks from the primary disk to the backup media to merge changes made to the primary disk while the first snapshot was absent, thereby making the current backup cycle consistent.

In another specific embodiment, a method includes: requesting a first backup of a virtual machine at a beginning of a current backup cycle; receiving, in response to the first backup request, a first snapshot of a primary disk of the virtual machine and a first listing of blocks on the primary disk that have changed since a last snapshot of the primary disk before the first snapshot; requesting deletion of the first snapshot; after deleting the first snapshot, copying, while the first snapshot is absent, blocks listed in the first listing from the primary disk to a backup media; after copying the blocks listed in the first listing, requesting a second backup of the virtual machine; receiving, in response to the second backup request, a second snapshot of the primary disk and a second listing of blocks on the primary disk that have changed since the first snapshot; and copying, while the second snapshot is present, blocks listed in both the first and second listings from the primary disk to the backup media to merge changes made to the primary disk while the first snapshot was absent, thereby making the current backup cycle consistent.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory configured to store one or more sequences of instructions which, when executed by the processor, cause the processor to carry out the steps of:

requesting a first snapshot of a primary disk of a virtual machine at a beginning of a current backup cycle;
receiving a first indication that the first snapshot has been created, the first indication comprising a first listing of blocks on the primary disk that have changed since a last snapshot, before the first snapshot, was requested;
requesting deletion of the first snapshot;
copying, while the first snapshot is absent, blocks listed in the first listing of changed blocks from the primary disk to a backup media;
after copying the blocks listed in the first listing of changed blocks, requesting a second snapshot of the primary disk for the current backup cycle;
receiving a second indication that the second snapshot has been created, the second indication comprising a second listing of blocks on the primary disk that have changed since the first snapshot was requested; and
copying, while the second snapshot is present, blocks listed in both the first and second listings of changed blocks from the primary disk to the backup media to merge changes made to the primary disk while the first snapshot was absent, thereby making the current backup cycle consistent, wherein the current backup cycle comprises a first phase, and a second phase, after the first phase, the first phase comprising copying the blocks listed in the first listing from the primary disk to the backup media, and wherein the processor carries out the steps of:
determining, during the second phase, whether a plurality of conditions exist, wherein a first condition exists when a particular block is listed in the first and second listings, the particular block having been marked as changed since a last backup cycle and during the first phase,
 a second condition exists when the particular block is listed in the first listing and is not listed in the second listing, the particular block having been marked as changed since a last backup cycle and not marked as changed during the first phase, and
 a third condition exists when the particular block is not listed in the first listing and is listed in the second listing, the particular block not having been marked as changed since the last backup cycle and having been marked as changed during the first phase,
if the first condition exists, repeating the copying of the particular block from the primary disk to the backup media to update a corresponding block on the backup media with changes made to the first block during the first phase;
if the second condition exists, not repeating the copying of the particular block from the primary disk to the backup media; and
if the third condition exists, not copying the particular block from the primary disk to the backup media for the current backup cycle.

2. The system of claim 1 wherein the processor carries out the steps of:
allowing the virtual machine to write to the primary disk during the copying of blocks listed in the first listing; and
not allowing the virtual machine to write to the primary disk during the copying of blocks listed in both the first and second listings, wherein during the copying of blocks listed in both the first and second listings, writes by the virtual machine are stored in the second snapshot.

3. The system of claim 1 wherein the first snapshot does not store writes by the virtual machine because the first snapshot is deleted immediately after the receiving an indication that the first snapshot has been created.

4. The system of claim 1 wherein a first duration of time is between the request for the first snapshot and the second snapshot, a second duration of time is between the current backup cycle and a last backup cycle,
wherein the first duration of time corresponds to an amount of time required to copy the blocks listed in the first listing from the primary disk to the backup media, and during which the virtual machine is allowed to write to the primary disk, and
wherein the first duration is less than the second duration.

5. The system of claim 1 wherein the processor carries out the steps of:
during the copying of blocks listed in the first listing, allowing the virtual machine to make changes to the primary disk, the changes including changes to the blocks listed in the first listing; and
during the copying of blocks listed in both the first and second listings, not allowing the virtual machine to make changes to the primary disk.

6. The system of claim 1 wherein the first snapshot is deleted before copying the blocks listed in the first listing.

7. A method comprising:
requesting a first snapshot of a primary disk of a virtual machine at a beginning of a current backup cycle;
receiving a first indication that the first snapshot has been created, the first indication comprising a first listing of blocks on the primary disk that have changed since a last snapshot, before the first snapshot, was requested;
requesting deletion of the first snapshot;
copying, while the first snapshot is absent, blocks listed in the first listing of changed blocks from the primary disk to a backup media;
after copying the blocks listed in the first listing of changed blocks, requesting a second snapshot of the primary disk for the current backup cycle;
receiving a second indication that the second snapshot has been created, the second indication comprising a second listing of blocks on the primary disk that have changed since the first snapshot was requested; and
copying, while the second snapshot is present, blocks listed in both the first and second listings of changed blocks from the primary disk to the backup media to merge changes made to the primary disk while the first snapshot was absent, thereby making the current backup cycle consistent, wherein the current backup cycle comprises a first phase, and a second phase, after the first phase, the first phase comprising copying the blocks listed in the first listing from the primary disk to the backup media, and wherein the method comprises:
determining, during the second phase, whether a plurality of conditions exist, wherein a first condition exists when a particular block is listed in the first and second listings, the particular block having been marked as changed since a last backup cycle and during the first phase,
 a second condition exists when the particular block is listed in the first listing and is not listed in the second listing, the particular block having been marked as changed since a last backup cycle and not marked as changed during the first phase, and
 a third condition exists when the particular block is not listed in the first listing and is listed in the second listing, the particular block not having been marked as changed since the last backup cycle and having been marked as changed during the first phase, if the first condition exists, repeating the copying of the particular block from the primary disk to the backup media to update a corresponding block on the backup media with changes made to the first block during the first phase;

if the second condition exists, not repeating the copying of the particular block from the primary disk to the backup media; and if the third condition exists, not copying the particular block from the primary disk to the backup media for the current backup cycle.

8. The method of claim 7 comprising:
allowing the virtual machine to write to the primary disk during the copying of blocks listed in the first listing; and
not allowing the virtual machine to write to the primary disk during the copying of blocks listed in both the first and second listings, wherein during the copying of blocks listed in both the first and second listings, writes by the virtual machine are stored in the second snapshot.

9. The method of claim 7 wherein the first snapshot does not store writes by the virtual machine because the first snapshot is deleted immediately after the receiving an indication that the first snapshot has been created.

10. The method of claim 7 wherein a first duration of time is between the request for the first snapshot and the second snapshot, a second duration of time is between the current backup cycle and a last backup cycle,
wherein the first duration of time corresponds to an amount of time required to copy the blocks listed in the first listing from the primary disk to the backup media, and during which the virtual machine is allowed to write to the primary disk, and
wherein the first duration is less than the second duration.

11. The method of claim 7 comprising:
during the copying of blocks listed in the first listing, allowing the virtual machine to make changes to the primary disk, the changes including changes to the blocks listed in the first listing; and
during the copying of blocks listed in both the first and second listings, not allowing the virtual machine to make changes to the primary disk.

12. The method of claim 7 wherein the first snapshot is deleted before copying the blocks listed in the first listing.

13. A computer program product, comprising a non-transitory computer-readable medium having a computer-readable program code embodied therein, the computer-readable program code adapted to be executed by one or more processors to implement a method comprising:
requesting a first snapshot of a primary disk of a virtual machine at a beginning of a current backup cycle;
receiving a first indication that the first snapshot has been created, the first indication comprising a first listing of blocks on the primary disk that have changed since a last snapshot, before the first snapshot, was requested;
requesting deletion of the first snapshot;
copying, while the first snapshot is absent, blocks listed in the first listing of changed blocks from the primary disk to a backup media;
after copying the blocks listed in the first listing of changed blocks, requesting a second snapshot of the primary disk for the current backup cycle;
receiving a second indication that the second snapshot has been created, the second indication comprising a second listing of blocks on the primary disk that have changed since the first snapshot was requested; and
copying, while the second snapshot is present, blocks listed in both the first and second listings of changed blocks from the primary disk to the backup media to merge changes made to the primary disk while the first snapshot was absent, thereby making the current backup cycle consistent, wherein the current backup cycle comprises a first phase, and a second phase, after the first phase, the first phase comprising copying the blocks listed in the first listing from the primary disk to the backup media, and wherein the method comprises:
determining, during the second phase, whether a plurality of conditions exist, wherein a first condition exists when a particular block is listed in the first and second listings, the particular block having been marked as changed since a last backup cycle and during the first phase,
a second condition exists when the particular block is listed in the first listing and is not listed in the second listing, the particular block having been marked as changed since a last backup cycle and not marked as changed during the first phase, and
a third condition exists when the particular block is not listed in the first listing and is listed in the second listing, the particular block not having been marked as changed since the last backup cycle and having been marked as changed during the first phase,
if the first condition exists, repeating the copying of the particular block from the primary disk to the backup media to update a corresponding block on the backup media with changes made to the first block during the first phase;
if the second condition exists, not repeating the copying of the particular block from the primary disk to the backup media; and
if the third condition exists, not copying the particular block from the primary disk to the backup media for the current backup cycle.

14. The computer program product of claim 13 wherein the method comprises:
allowing the virtual machine to write to the primary disk during the copying of blocks listed in the first listing; and
not allowing the virtual machine to write to the primary disk during the copying of blocks listed in both the first and second listings, wherein during the copying of blocks listed in both the first and second listings, writes by the virtual machine are stored in the second snapshot.

15. The computer program product of claim 13 wherein the first snapshot does not store writes by the virtual machine because the first snapshot is deleted immediately after the receiving an indication that the first snapshot has been created.

16. The computer program product of claim 13 wherein a first duration of time is between the request for the first snapshot and the second snapshot, a second duration of time is between the current backup cycle and a last backup cycle,
wherein the first duration of time corresponds to an amount of time required to copy the blocks listed in the first listing from the primary disk to the backup media, and during which the virtual machine is allowed to write to the primary disk, and
wherein the first duration is less than the second duration.

17. The computer program product of claim 13 wherein the method comprises:

during the copying of blocks listed in the first listing, allowing the virtual machine to make changes to the primary disk, the changes including changes to the blocks listed in the first listing; and during the copying of blocks listed in both the first and second listings, not allowing the virtual machine to make changes to the primary disk.

\* \* \* \* \*